Dec. 20, 1949

A. C. McGARRY 2,491,749

THERMOSTATIC HEAT CONTROL FOR WATERLESS COOKERS

Filed Sept. 25, 1947

ALFRED C. McGARRY,
INVENTOR.

BY

ATTORNEY

Patented Dec. 20, 1949

2,491,749

UNITED STATES PATENT OFFICE 2,491,749

THERMOSTATIC HEAT CONTROL FOR WATERLESS COOKERS

Alfred C. McGarry, Tujunga, Calif.

Application September 25, 1947, Serial No. 775,997

5 Claims. (Cl. 236—15)

This invention relates to a thermostatic heat control for waterless cookers.

More specifically speaking the invention pertains to a portable thermostatic heat control means adapted for mounting upon a gas stove above a burner thereof to support a waterless cooker and equipped with a thermostatic cooking heat regulator which well adapts the article for use in cooking in accordance with the modern hygienic and increasingly popular waterless and semi-waterless methods.

Utensils for cooking in accordance with these methods fall, in a general way, into two classes, namely, those provided with steam-seal or vapor-seal covers, and those with no covers at all. Both, however, have in common the principle of cooking at a relatively low heat of approximately 180 to 190 degrees Fahrenheit.

Scientific tests have shown that the combination of heat, water and oxygen is very disastrous to vitamins and vegetable minerals, and that all foods should therefore be cooked at below boiling temperature.

By the cooking methods generally used at the present time for waterless cooking, not accompanied by automatic heat controls, considerable quantities of food are burned because the stoves used cannot be regulated to maintain a low enough temperature for cooking at the above stated recommended heat. In order to overcome this defect asbestos pads are sometimes used between the cooking utensil and the source of heat, with the result that the food does not cook thoroughly or within the time desired. Also, the utensil is sometimes pushed partly off the flame to reduce the excessive heat coming therefrom. However, both these artifices are unreliable expedients, and up to the present time no device has come into general use capable of automatically regulating the heat so as efficiently to cook all portions of the food at the desired low temperature.

By the present invention an automatic heat regulator for cooking utensils has been provided which is capable of meeting both the above mentioned requirements.

Accordingly it is an object of the present invention to provide, between the utensil in which the food is being cooked and a stove top or flame, a heat-conveying device equipped with two thermostatic units arranged to cooperate in the control of a single damper, one of said thermostatic units being operatively connected with a catch which is arranged to maintain the damper open until a relatively high cooking temperature has been reached within the utensil, thus driving out the air and causing vapor to be substituted therefor (a necessary preliminary to hygienic cooking), whereupon said unit which is connected with said catch releases the latter so that the damper will gravitate to a closed position subject to the control thereof by the other thermostat; and means operatively connecting the latter with said damper so as to regulate the extent of the opening thereof in the manner required to perform the subsequent part of the cooking operation.

Another object of the invention is to provide a simplified, more compact and more advantageously arranged combination of thermostatic units and mounting means for said units, housed within a support for a cooking utensil positionable between the utensil and the source of cooking heat supplied therefor.

Another and more specific object is to provide an improved, more conveniently manually operable control means for regulating the operation of the aforesaid thermostatic unit which controls the amount of heat supplied to the cooking utensil during the first part of the cooking operation, so that this thermostatic unit will operate in the desired manner when its services are required, and will be maintained in an inoperative condition when it is desired that the other thermostatic unit control the supply of cooking heat.

Other objects, advantages and features of invention will hereinafter appear.

Referring to the accompanying drawing, which illustrates a preferred embodiment of the invention, Fig. 1 is a vertical section of the complete device, the plane of section being indicated by angular line 1—1 on Fig. 2. In this view the thermostatically controlled damper plate and the control means therefor are shown in full lines in the open position of said plate and in dotted lines in the closed position thereof.

Figure 1:
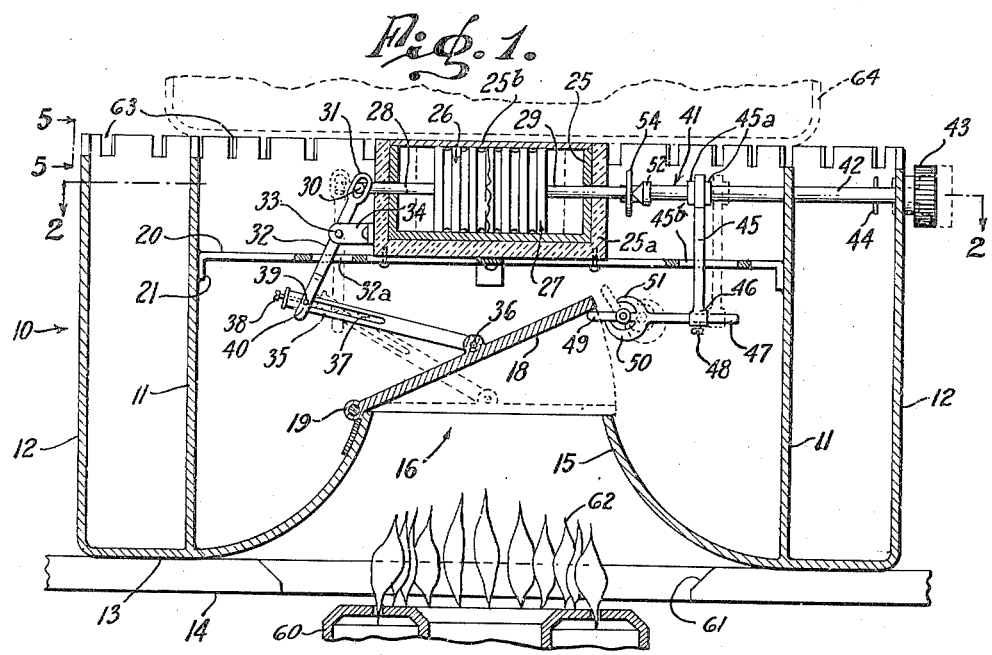
Figure 2:
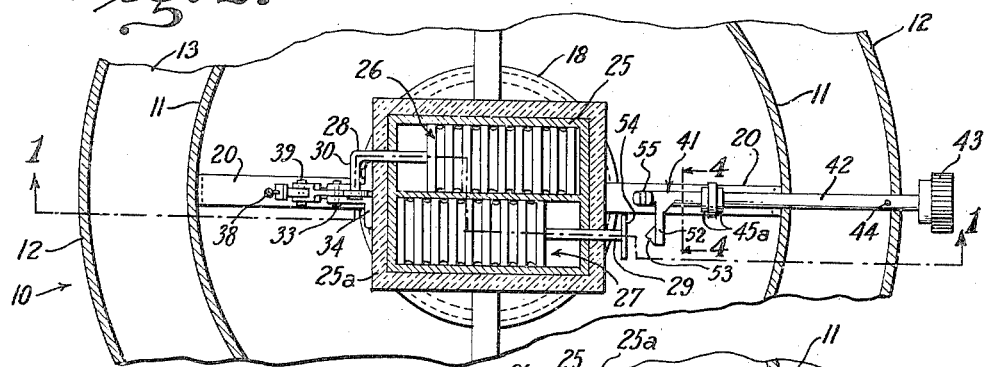
Fig. 2 is a horizontal section of the utensil on the plane indicated by line 2—2 on Fig. 1, upper and lower portions of the view being broken away in order to contract the size thereof. In this view the catch means, which at times prevents the damper plate from closing, is shown in its retracted, inoperative position.
Figure 5:
Fig. 5 is an enlarged, fragmental, elevational detail taken from the viewpoint indicated by the arrows of line 5—5 of Fig 1.

Referring in detail to the drawing, the open-topped tubular support 10 is shown cylindrically shaped with a vertical inner wall 11 and concentric vertical outer wall 12, the provision of said outer wall not being essential, but adapting the device for being more advantageously used with a plurality of sizes of different cooking utensils.

Said open-topped support has a bottom wall portion 13 to rest upon a stove top 14 and furnished with an upwardly deflected central portion 15 which surrounds a spacious, central, heat admission aperture 16. A damper plate 18 is pivoted at 19 to one side of the rise 15 so as to swing to and from a closing relation to said opening 16.

Above said opening and damper a horizontally extending spider 20 is shown, having arms the outer end portions of which terminate in downwardly directed foot portions 21 welded or otherwise secured internally to the upper part of the cylindrical wall member 11. Upon the central portion of said spider is mounted a thermostat casing 25 which contains two thermostats 26 and 27, both these thermostats being of the bellows type, the thermostat 26 including an operating rod 28 and the other thermostat having an operating rod 29. Said casing 25 is surrounded below and laterally by heat insulating material 25a but about the thermostats is a heat-conducting plate 25b. Said thermostats are made identical except for their attaching portions, with an operating range about 160 to 220 degrees F. Conventional adjustments are provided on their attachments to accomplish required operation.

Said operating rod 28 is shown L-shaped with an outer limb 30 which has a combined pivotal and slidable connection with the longitudinally slotted upper end portion 31 of a lever 32 which is pivotally supported between its ends at 33 to swing in a vertical plane. The spider 20 is slotted at 32a to provide a working clearance for said lever. Said lever is shown carried by a bracket 34 attached to the lower part of the thermostat insulation 25a. To the lower end portion of said lever 32 is adjustably attached one end portion of a lost motion connection comprising a rod 35 the lower end portion of which is pivotally connected at 36 to the damper plate 18, and the upper part of which has through it a longitudinal slot 37. The non-slotted upper end portion of said rod 35 is axially bored to receive a manually turnable adjusting screw 38, operable to vary, in effect, the length of the slot 37, so that a pin 39 carried by the bifurcated lower part 40 of lever 32 will have its travel along said slot regulated accordingly.

When the cooking is to be done in a steam-sealed or vapor-sealed utensil the damper should be allowed to remain open until the utensil has been heated sufficiently to drive out from therewithin the air which oxidizes minerals and vitamins, and to form condensation for a vapor seal. In order to accomplish this a manually controllable and thermostatically operable catch mechanism 41 is provided, which initially holds the damper open. Said catch mechanism comprises a rod 42 that is both slidable and turnable when manually operated by means of a button 43 carried by said rod outside of the tubular support's outer wall 12. Said rod fits slidably and turnably within bearing apertures provided for it in the walls 11 and 12 and carries a stop pin 44 engageable with the wall 12 to limit its outer movement. Within the wall 11 said rod has loosely fastened to it a radial arm 45 which, in relation to the rod, can turn freely between collars 45a secured to the rod, said arm passing slidably through a slot 45b in the adjacent spider arm.

Said arm 45 has its outer end enlarged at 46 and transversely bored to receive a catch pin 47 clamped in place by set screws 48. To one end of said pin 47 is swingably pivoted the tongue or catch proper 49 arranged to operate between stop fingers 50 and 51 carried by said pin 47. Said tongue at times underlies and holds open the damper plate 18 and at no time obstructs upswing of said plate to a widely open position.

The aforesaid radial arm 45 is spaced considerably away from the inner end of the catch-operating rod 42, but close to its inner end said rod carries a radial finger 52 the outer end portion of which has formed upon it a laterally directed angular projection 53 the point of which is, at times, in an abuttable relation to a disk-like head 54 carried by the outer end of the aforementioned rod 29 of the thermostat unit 27.

The rod 42 of the catch mechanism also carries, at its extreme inner end, a bifurcated laterally directed stud 55 which at times straddles the peripheral portion of the disk 54, so that, at such times the thermostat 27, when sufficiently heated, will withdraw the catch mechanism to the inoperative, dotted line position of Fig. 1.

In Fig. 1 the upper part 60 of a burner is shown carried by the stove 14 within a burner opening 61, said burner and its flame 62 being in a subjacent, concentric relation to the heat-admission opening 16 through the bottom of the tubular support. Along the upper edges of the walls 11 and 12 are shown a series of cut-outs shown as notches 63 to allow the products of combustion to escape from underneath the cooking utensil 64, a fragment of which is delineated in dotted lines.

Thus the aforementioned horizontal heat conducting plate 25b, which overlies the thermostats, is advantageously positioned, because through it temperature conditions of said utensil are directly communicated to said thermostats.

Figure 3:
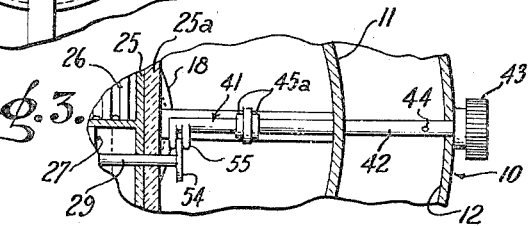
Fig. 3 is a reproduction of a right hand portion of Fig. 2, except that the catch means for the damper plate is shown in its advanced, operative position.
Figure 4:
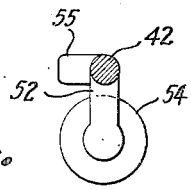
Fig. 4 is an enlarged sectional detail, the plane of section thereof being indicated by line 4—4 of Fig. 2.

Preparatory to putting the device into operation the burner 60 is lit and adjusted to approximately medium heat. Thereupon the device is placed upon the burner in a concentric relation to the latter. The cooking utensil 64 containing the food to be cooked is then placed on the device. If this is a steam-seal or vapor-seal utensil, the button 43 which operates the catch mechanism 41 is pushed in and then turned to the engaging position shown in Fig. 3, wherein the bifurcated stud 55 straddles the disk-like head 54 of the thermostat unit 27. In performing the combined turning and sliding movement of the button 43 and rod 42 the projection 53 of the finger 52 is first brought into contact with the outer surface of the disk 54 so as to serve as a finger, this being done to bring the bifurcation in the stud 55 into the same vertical plane as said disk so that the rod 42 may then be rotated to bring said stud astride of the disk.

The thermostat unit 27 having been pre-set by the manufacturer by means of the just stated adjustment of the catch mechanism 41, the contents of the mounted utensil 64 become heated to 212 degrees F., the catch tongue 49 preventing closure of the damper plate 18, even though, somewhat before said temperature is reached within said utensil, the thermostat 26 attempts to perform its function of closing said damper. During this time the lost motion connection between the lever 32 and damper plate 18 permits said thermostat 26 to function in an unobstructed manner.

When the temperature within the utensil 64 reaches the point where steam or vapor is formed therein (to drive out the air which oxidizes minerals and vitamins, and to form condensation for a vapor seal), approximately 212 degrees F., thermostat 27 pushes the restrictor catch away from under the damper plate and the damper falls to the closed position. The lost motion connection of the lever 32 with said damper, at this time permits the damper plate to gravitate to fully closed position.

Thermostat 26 is now free to open and close the damper plate between the limts of approximately 180 to 190 degrees F., and will so operate until the cooked food is removed according to the specified cooking time usually supplied by the cookware manufacturers.

When the cooking utensil is removed both thermostats retract being exposed to the cooling effect of the air of the room above the heat conducting cover 25b, though they are heat-insulated on the five other sides. The full retraction effected by the thermostat 26 is reached at approximately 165 or 170 degrees F., at which temperature the damper plate is opened sufficiently to engage the restrictor catch moved into its path by thermostat 27. Throughout the temperature range for normal cooking the free edge of the damper plate will swing through an arc just short of the restrictor catch, the latter, when the device is manufactured, being so positioned as to accomplish this result.

For the non-vapor types of cookware, usually having no covers at all or non-seal covers, low heat cooking alone is used, unless otherwise specified by the manufacturer. For this kind of cooking the button 43 is turned to disengage the bifurcated stud 55 from the head 54 and then said button is pulled to the outer limit of its movement. The device and utensil supported thereon are then placed over the flame and left there for the specified time. Under these conditions thermostat 26 immediately assumes control and automatically maintains the desired temperature by varying the opening of the damper plate.

I claim:

1. In a thermostatic heat control for waterless cookers, an open-topped tubular support having a bottom portion adapted to be used with burners of conventional stoves and a top portion adapted to support a cooking utensil, said bottom portion having through it a heat admission opening, a damper connected with said bottom portion to control the admission of heat through said opening, a mounting means carried internally by said tubular support and located above said opening and damper, a thermostat supported by said mounting means in a position to be indirectly operated by the heat ascending through said opening, said thermostat including a temperature actuated portion and a horizontally extending rod connected with said portion and movable axially in response to the movement of the temperature actuated portion, a lever pivotally supported between its ends adjacent to said thermostat to swing in a vertical plane, said rod being connected pivotally to said lever above the pivotal support of the latter, said damper being urged by gravity toward the closed position, and an operative connection connecting said lever below its pivot with the aforesaid damper to open the latter varying amounts in opposition to gravity.

2. In a thermostatic heat control for waterless cookers, an open-topped tubular support having a bottom portion adapted to be mounted superjacent to burners of conventional stoves and a top portion adapted to support a cooking utensil, said bottom portion having through it a heat admission opening, a damper connected with said bottom portion to control the admission of heat through said opening, said damper being so mounted that it tends to gravitate to a closed position, a thermostat mounted upon said support in a position to be indirectly operated by the heat ascending through said opening, means mechanically connecting said thermostat with said damper so that heating of said thermostat will cause it to lower said damper and cooling thereof will tend to raise said damper, a catch mechanism mounted upon said support and manually adjustable to a position wherein it disposes an upswingable catch proper in the path of said damper so that the latter when moved upwardly beyond said catch proper is prevented from gravitating to closed position, and a second thermostat mounted upon said support and positioned to move said catch proper out of the path of said damper when heat within the aforesaid cooking utensil has exceeded a predetermined amount.

3. The subject matter of claim 2, and said second thermostat having a horizontally extending operating rod which terminates in a head, and said catch proper being carried by a horizontally movable means which is manually adjustable into and out of the path of said head.

4. The subject matter of claim 2, and said second thermostat having a horizontally extending operating rod which terminates in a disk that lies in a vertical plane, and said catch proper being carried by a manually operable means which is both turnable and horizontally movable, said means comprising a radial bifurcated stud turnable in a straddling position in relation to the peripheral portion of said disk, and a radial finder finger abuttable against the outer face of said disk to bring said bifurcated stud into the same vertical plane as that occupied by said disk.

5. In a thermostatic heat control for waterless cookers, a tubular support having a horizontal top portion to support a cooking utensil, said support being adapted for mounting over a source of heat and surrounding a space through which the heat may pass upwardly from said source, a damper connected with said support to control the passage of the heat upwardly therethrough, mounting means carried internally by the upper part of said tubular support, a casing supported upon said mounting means, said casing including a horizontal plate positioned substantially to contact the bottom of a cooking utensil when the latter is positioned upon said support, a thermostat contained within said casing in a subjacent relation to said plate, the lower part of said casing being heat-insulated to render said thermostat directly responsive only to heat passing downwardly thereto through said plate, and means operatively connecting said thermostat with said damper.

ALFRED C. McGARRY.

REFERENCES CITED

The following references are of record in the file of this patent:

UNITED STATES PATENTS

| Number | Name | Date |
| --- | --- | --- |
| 1,116,534 | Baker | Nov. 10, 1914 |
| 1,536,689 | Pierce | May 5, 1925 |